Oct. 31, 1961     F. GELLI     3,006,487

LOAD PLATFORM FOR VEHICLES

Filed April 22, 1959     7 Sheets-Sheet 1

INVENTOR.
FALIERO GELLI
BY
ATTORNEYS

Oct. 31, 1961     F. GELLI     3,006,487
LOAD PLATFORM FOR VEHICLES
Filed April 22, 1959     7 Sheets-Sheet 4

INVENTOR.
FALIERO GELLI
BY
ATTORNEYS

INVENTOR.
FALIERO GELLI

United States Patent Office 3,006,487
Patented Oct. 31, 1961

1

3,006,487
LOAD PLATFORM FOR VEHICLES
Faliero Gelli, 405 Ashford Ave., Dobbs Ferry, N.Y.
Filed Apr. 22, 1959, Ser. No. 808,088
15 Claims. (Cl. 214—83.24)

This invention relates to a load platform to be mounted in the back of a station wagon, truck or the like, and slidably movable from a normal position within the body of the vehicle to an outside position in rear of the latter whereat it is readily accessible for the placement or removal of a load thereon or for the use of such platform or apparatus mounted thereon.

The principal purpose of the invention is to provide an improved device of this kind, having a high mechanical efficiency and a very reliable operation.

In accordance with one of the objects of the invention there is provided a slidable load platform which is of very simple and sturdy design, which is constructed to resist wear for the life of the vehicle, and which is operable by switch means using power generated by mechanism provided in the vehicle.

Another object of the invention is to provide a load platform of the indicated type constructed so that its load bearing area may be varied to conform to variations in the loading area available in the vehicle as for example, the different loading areas available in a station wagon because of the positions of the rear seat in such vehicle.

A further object of the invention is to provide improved means for supporting the load platform to enable the latter to be moved smoothly and easily between its loading and load carrying positions with the use of relatively little power.

A further object of the invention is to provide means whereby normal movement of the platform relative to the vehicle may be automatically controlled, but which may be operated to enable the platform to be moved to positions beyond its range of normal movement.

A still further object of the invention is to provide a load platform construction which will render readily accessible the spare tire or other things which may be stored thereunder without necessitating the removal or disarrangement of the platform or its supporting and operaing mechanisms.

Other objects of the invention as well as the novel features of the construction thereof will become apparent from the following description when read in connection with the accompanying drawings in which.

2

Figure 1:
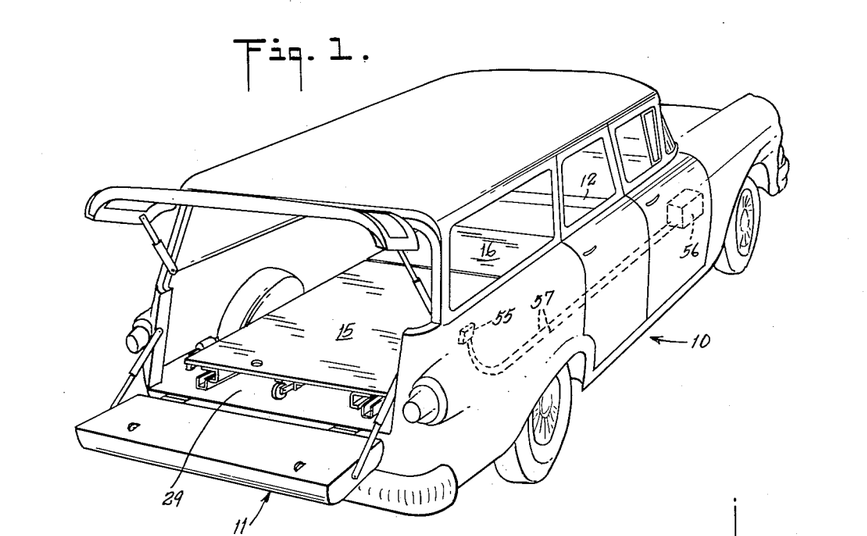
FIG. 1 is a perspective view of a station wagon provided with a load platform constructed in accordance with the invention, the drawing showing the rear seat of the car folded down and the load platform extended to its maximum load carrying condition.
Figure 3:
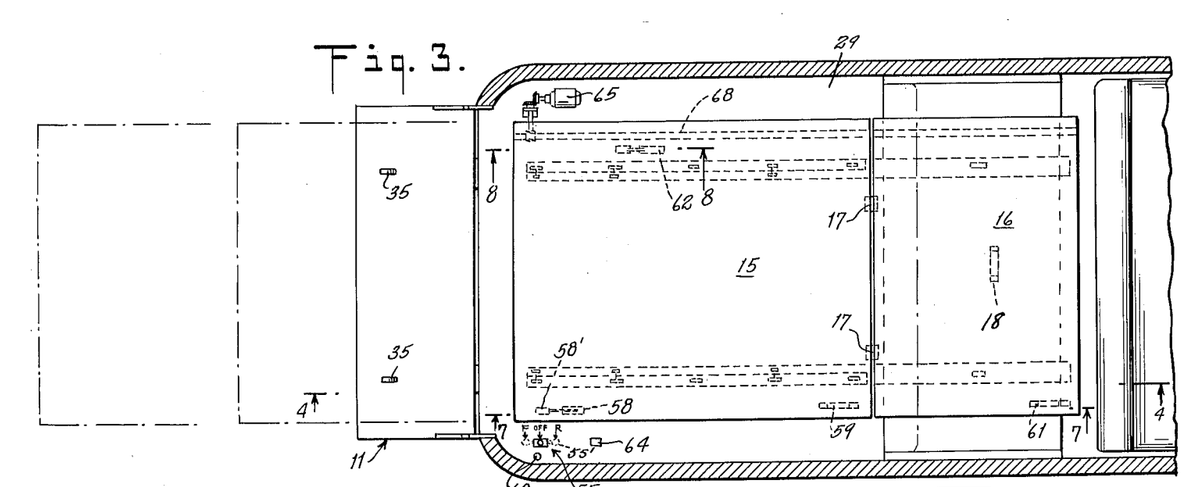
FIG. 3 is a horizontal section of the rear of the vehicle shown in FIG. 1 and showing in top plan view the load platform in extended condition within the vehicle, the ranges of movement of such platform relative to the vehicle being indicated in dotted outline.
Figure 3A:
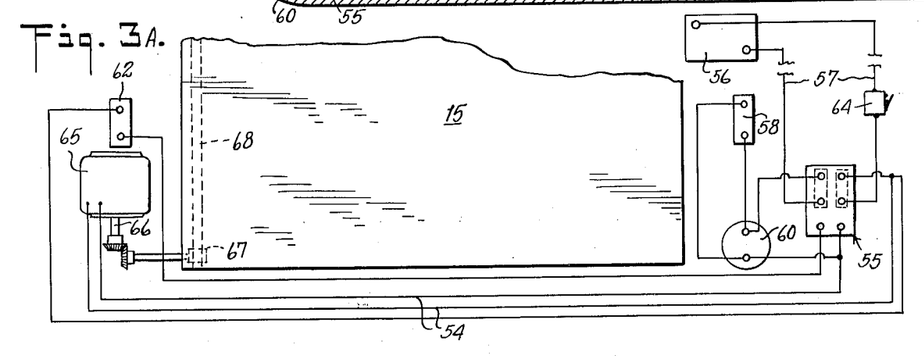
FIG. 3A is an enlarged detailed view showing schematically the circuit arrangement for the mechanism controlling the operation of the load platform.

In the drawings, the reference numeral 10 indicates generally a station wagon of well known construction provided with a tail gate 11 which may be lowered to horizontal position as shown in FIG. 1 of the drawings. The station wagon includes also a front seat 12 and a rear seat 13, the back of the latter of which may be folded down in the usual manner upon the seat thereof to bring the rear of such back flush with the floor 29 of the vehicle in back of such rear seat 13. Supported on the floor 29 is a load platform 15 having an area substantially equal to the area of the available space in back of the rear seat 13. Connected by hinges 17 to the front end of the platform 15 is a platform extension 16 which is normally folded down on top of platform 15 when the seat 13 is in use. The extension 16 may have provided thereon a handle 18 in FIG. 3 to facilitate the movement from such folded position to an extended position as shown in FIG. 3. In such normal condition of the platform 15 and extension 16 a load may be placed directly upon the extension as well as on the uncovered portion of platform 15. When, however, the back of seat 13 is folded down, the extension 16 may be unfolded so that it extends into the area over the rear seat 13. The area of the extension 16 is substantially equal to the horizontal area occupied by the rear seat 13 so that when the extension is so unfolded the load bearing area of the platform is increased by that amount.

Figure 4:
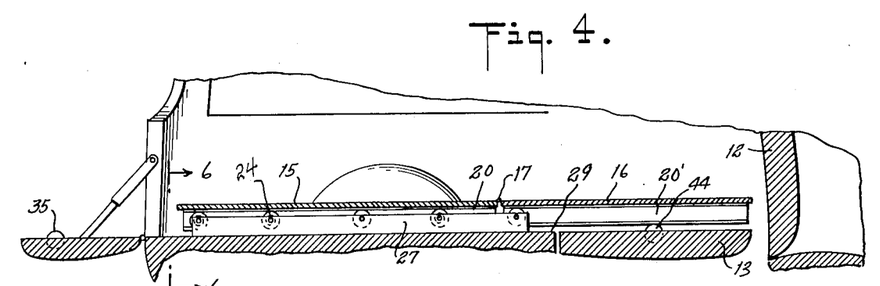
FIG. 4 is a vertical sectional view taken along the line 4—4 in FIG. 3.
Figure 6:
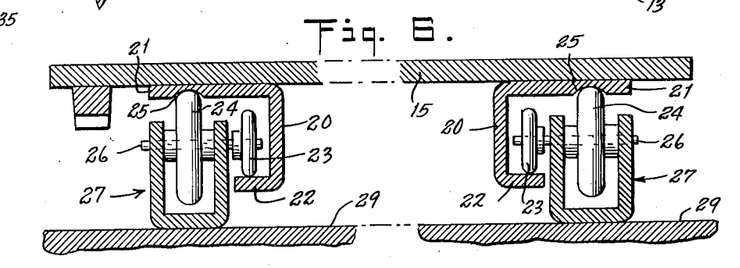
FIG. 6 is a sectional view taken along the line 6—6 in FIG. 4 to show the construction of the means for slidably supporting the platform.
Figure 7:
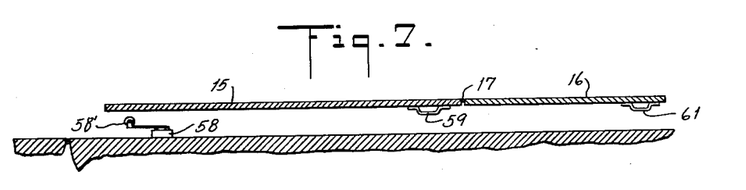
FIG. 7 is a sectional view taken along the line 7—7 of FIG. 3 to show the mechanism for controlling the range of outward movement of the platform.

The load platform 15 is provided on its underside with two rails or tracks 20, 20, which extend approximately the entire length of such platform in substantially parallel spaced relation. The tracks 20 are each U-shaped in section and include an upper horizontal flange 21 which is integral along its inner edge with the upper edge of the vertical center portion of the track and which is secured to the under-surface of the platform 15 in any suitable manner as by means of screws. The lower edge of such center portion is integrally joined to the inner edge of a lower horizontal flange 22 of substantially less width than the upper flange 21. The lower flange 22 of each rail is engaged on its upper surface by a series of spaced rollers 23 which extend lengthwise of the vehicle beneath the platform 15. Associated with the rollers 23 are a series of rollers 24 of larger diameter and which seat in a longitudinally extending groove 25 provided in the under-surface of upper flange 21. Thus, the two series of rollers 23 and 24 associated with the flanges 22 and 21, respectively, lock the tracks 20 in association therewith and against horizontal displacement thereof and prevent the platform 15 from vibrating or moving vertically during the use of the vehicle. The rollers 23 and 24 are arranged in pairs and each pair thereof is revolvably mounted on one of a series of shafts 26 supported in horizontally aligned, spaced relation along the vertically disposed flanges of a U-shaped roller support 27. There is a roller support 27 associated with each track 20 and each of the roller supports 27 is suitably secured, as by welding, to the floor 29 of the vehicle in spaced parallel relation to the other roller support. The roller supports extend on the floor 29 from a point adjacent to the tail gate 11 of the vehicle to a point adjacent to the rear seat 13 of the vehicle.

Figure 5:
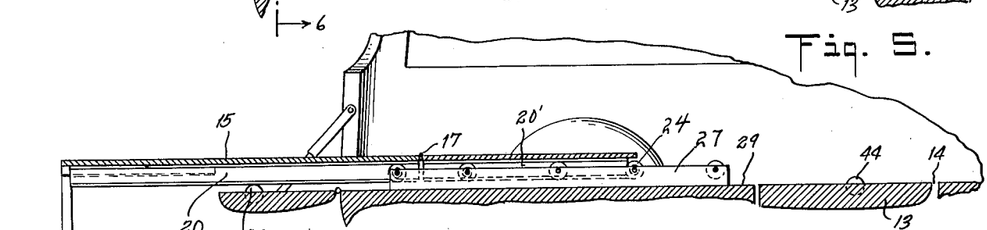
FIG. 5 is a view similar to FIG. 4, but showing the load platform moved rearwardly to loading position as in FIG. 2.

It will be apparent from the foregoing that the platform 15, through the tracks 20, will ride readily on the rollers 24 and that the latter will be prevented from becoming disengaged from their tracked engagement with the grooves 25 in such tracks by the engagement of the rollers 23 with the flanges 22 of such tracks. The rollers 23 and 24 are provided with ball bearing units to facilitate their rotational movement and the tires of such rollers preferably are made of a suitable noiseless material such as rubber. The lengths of the tracks 20 and the series of rollers 23, 24 are quite substantial and such that the platform 15 may be moved over the tail gate and substantially beyond the latter without disengagement of the tracks 20 from the rollers 23, 24 (compare FIGS. 4 and 5). The extension 16 is provided with a pair of relatively short rails 20′, 20′ which are similar in construction to the rails 20 and are in alignment with the latter, so that when platform 15 is withdrawn sufficiently from the vehicle the rails 20′ will enter into an engagement with the rollers 23 and 24 on the roller supports 27 similar to that of the rails 20 and form a continuation of the latter, as shown in FIG. 5 of the drawings. The extension 16 and rails 20′ thereof will function therefor as an integral part of platform 15 so far as the rollers 23 and 24 are concerned and will permit further movement of the platform 15 out of the back of the vehicle without disengagement of the associated rails from such rollers. Provided on the tail gate 11 are a pair of rollers 35, 35 arranged in aligned relation with the lower flanges 22 of the rails 20 so such flanges will ride on such rollers when the platform is moved outwardly over the tail gate 11 (note FIG. 5).

Figure 2:
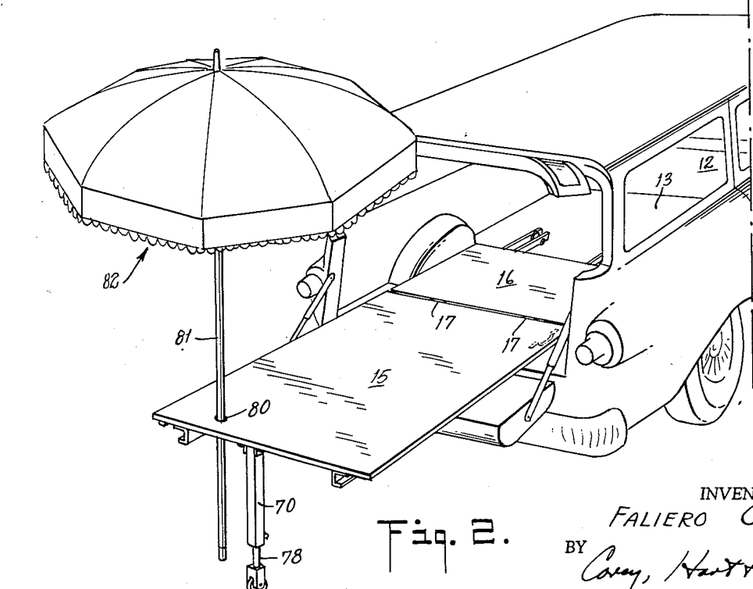
FIG. 2 is a similar view of the rear end of the car and shows the load platform moved rearwardly to a position in which it is supported in part by the body of the vehicle, the tail gate thereof, and an additional supporting device, and in which it is readily accessible for the loading and unloading and for use as a table or a dispensary for food or other articles.
Figure 9:
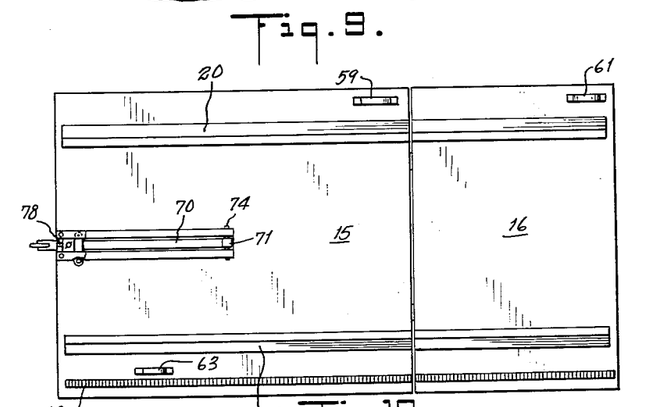
FIG. 9 is a bottom plan view of the loading platform.
Figure 10:
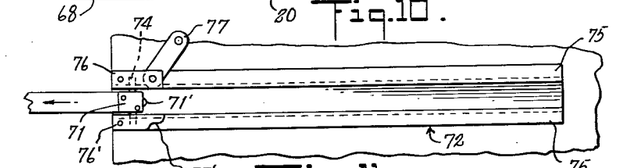
FIG. 10 is in an enlarged bottom view of the supporting device in extended position.
Figures 11, 12:
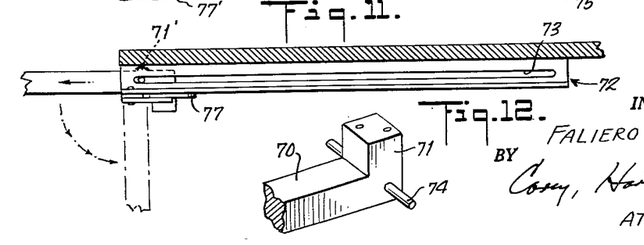
FIG. 11 is a vertical sectional view of the part shown in FIG. 10 and indicating the manner in which the support member of such device is swung down to supporting position.
FIG. 12 is an enlarged perspective view of the attached end of the support member.

When the platform 15 has been moved outwardly to its fullest extent, the outer end thereof may be additionally supported by a member 70 provided at its upper end with a transverse end portion 71 which, in the supporting position of member 70 (note FIG. 2 and the dotted line position in FIG. 11), increases the load bearing area between such member and the platform and functions as a brace to make the member 70 more rigid. The end portion 71 may be provided with a ball detent 71′ which engages a locking recess formed in the outer end of a guide 72 to releasably lock the member 70 in the latter's supporting position. The guide 72 extends longitudinally of and is secured in any suitable manner to the underside of the central rear part of platform 15. The body of the guide 72 is U-shaped and the side walls thereof are provided with elongated, longitudinally extending slots 73 through which project the ends of a pin 74 extending through end portion 71 to slidably connect the member 70 to guide 72. Mounted on the rear ends of the flanges 75 which are integrally formed with the lower longitudinal edges of the side walls of guide 72, is a latching device composed of plates 76, 76′ secured in aligned relation to such flanges. Plate 76 has pivotally secured to its inner end a latch member 77 which releasably latches with a suitably shaped latching recess 77′ formed on the inner edge portion of plate 76′. It will be noted from FIG. 9 that the latch member 77 is used to properly secure the lower end of member 70 to the platform 15 and to support it on the latter when such member is in a retracted position with the pin 74 advanced to the forward ends of the slots 73. When the platform is moved out of the vehicle beyond the tail gate 11, the latch member 77 is pivoted out of latching position as shown in FIG. 10 to enable the member 70 to be pulled out straight until the pin 74 is moved to the rear ends of the slots 73 as in such figure. The member 70 is then turned down to the dotted line position shown in FIG. 11 until the ball detent 71′ is received in its associated locking recess. The latch member 77 is then moved back into latching position under the end portion 71 to secure the latter in its locked position against inadvertent release of the ball detent 71′. The body of member 70 is tubularly shaped and slidably receives a rod 78 which may be secured in adjusted position by any suitable means such as the finger manipulatable set screw illustrated. The lower end of the rod 78 is provided with a foot roller 79 which rests on the ground in the supporting position of member 70. When the platform 15 is in its fully extended position therefore, the support it receives by the member 70, in cooperation with the support it receives by the rollers 35 on the tail gate 11 and the rollers 24 on the supports 27 renders it quite rigid and stable and capable of supporting substantial weights. It will be noted that in this position of the platform 15, the extension 16 thereof will be supported by the rollers 24 on the holders 27, as is shown in FIG. 5 of the drawings. The member 70 may be readily restored to normal position by first swinging the latch member 77 to unlatched position with the use of sufficient force to release it from the latching edge 77′ of plate 76′, then pivoting the member 70 upwardly using sufficient force to cause the ball detent 71′ to retract from its locking engagement with its associated locking recess, and then pushing the member 70 forwardly into the guide 72 until it reaches the position shown in FIG. 9, whereupon the latch member 77 will again be moved to latching position. The platform 15 may then be slidably moved back into the vehicle. As the extension 16 is returned to position over the folded seat 13 when the platform 15 is so moved back into the vehicle, the rails 20′, 20′ on such extension will ride off the rollers 24 of the supports 27 onto a pair of supporting rollers 44 rotatably mounted on the back of the seat 13. The location of the rollers 44 on the seat 13 is such that the extension 16 is at all times supported either by such rollers 44 or the rollers 24 on the supports 27.

Figure 8:
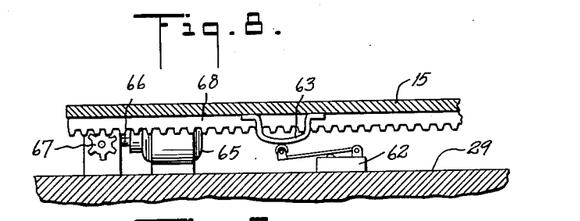
FIG. 8 is a vertical sectional view taken along the line 8—8 in FIG. 3 to illustrate the means for shifting the load platform outwardly and inwardly and the means for controlling the inward movement of the platform.

The platform 15 and its extension 16 may be shifted to any desired position relative to the car floor 29, the tail gate 11 and the car seat 13 by means of an electrical reversible motor 65 mounted on the floor 29 of the vehicle and having connected to its driven shaft 66 a gear 67 which meshes with a rack bar 68 secured to the underside of the platform 15 and extending longitudinally of the vehicle (compare FIGS. 3 and 8 of the drawings). It will thus be seen that as the motor 65 is caused to rotate in one direction or the other, such rotative motion is transmitted to gear 67 which causes the rack 68 to move one way or the other in the direction of its length longitudinally of the vehicle, thereby causing the platform 15 to move in the same direction. The motor 65, as is shown more clearly in FIG. 3 of the drawings is included in an electrical circuit composed of wires 54, a double throw, three pole main switch 55, wires 57 and the vehicle battery 56. It will be noted that when the finger piece 55' of the toggle switch 55 is in an intermediate position the motor 65 is cut off from its power supply 56. When the finger piece is operated to the right, as viewed in FIG. 3, current is furnished to motor 65 to cause it to rotate in a direction to move the platform 15 rearwardly or to the left as viewed in FIG. 3 of the drawings. On the other hand, when the finger piece is operated to the left, as viewed in FIG. 3, the motor is rotated in the opposite direction to return the platform within the body of the vehicle. The outermost position of the platform 15 may be controlled by a limit switch 58 mounted on the floor 29 of the vehicle adjacent to the rear end of the latter. The finger 58' of switch 58 is engageable by an actuating member 59 provided on the underside of platform 15 when such platform has moved rearwardly from its normal position a distance substantially equal to its length. The switch 58 is a normally closed switch and is connected in the circuit of switch 55 to exercise a dual control over the operation of motor 65. Thus when the member 59 actuates the normally closed switch 58 at the end of the rearward movement of platform 15 it will cause the motor to stop driving the rack bar 68 rearwardly. The movement of the platform 15 therefore is under the combined control of both switches 55 and 58; switch 55 controlling the normal stopping of the platform 15 and its movement in both direction and switch 58 controlling the outward movement of such platform. Associated with limit switch 58 is a push-button jumper switch 60 which enables the operator to cause the platform 15 to continue its rearward movement after such movement has been stopped by the engagement of member 59 with limit switch 58. As the platform 15 moves further rearwardly, a second actuating member 61 provided on the underside of the platform extension 16 adjacent to the inner end thereof will come into engagement with limit switch 58 to again actuate the same to stop the driving action of the motor 65. This is the furthest rearward movement that is usually attained by the platform 15 in the normal use of the circuit and motor. When the main switch 55 is then actuated to return the platform 15 and its extension 16 into normal positions within the body of the vehicle, such inward movement of such parts is controlled by a second limit switch 62 mounted on the vehicle floor 29 adjacent to the motor 65 and an actuating member 63 provided on the underside of platform 15 at the rear end of such platform (compare FIGS. 3, 8 and 9). Thus the platform is operated under the combined control of the switches 55, 58 and 62. Included in the circuit between switch 55 and the power supply 56 is a thermal overload switch 64 which will automatically open the circuit to stop motor 65 in the event any condition exists which causes the normal operating temperature of the circuit to rise, such as for example, if the operator failed to properly store the supporting member 70 in the position of FIG. 9 before operating switch 55 to withdraw the platform.

Figure 15:
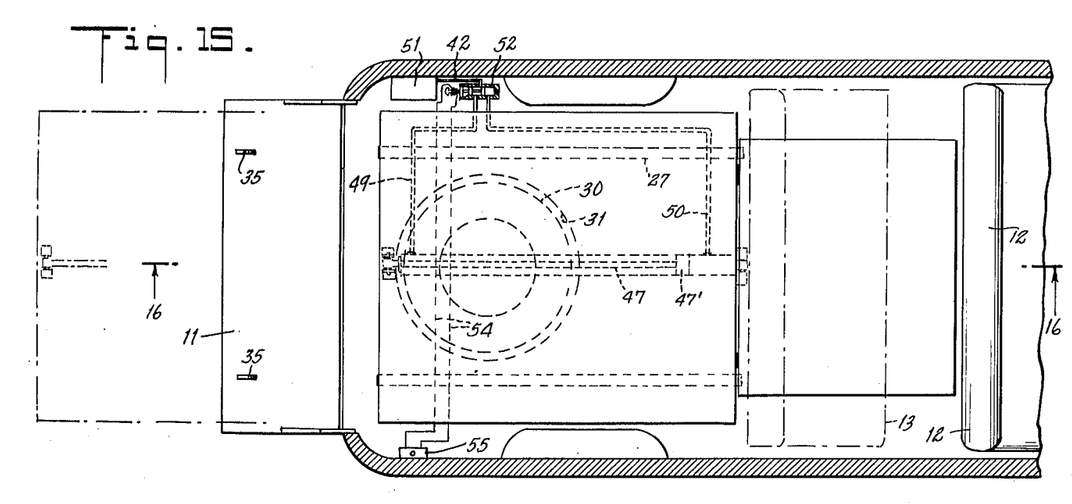
FIG. 15 is a view similar to FIG. 3, but showing the manner in which the load platform may be operated by means of a hydraulic system.
Figure 16:
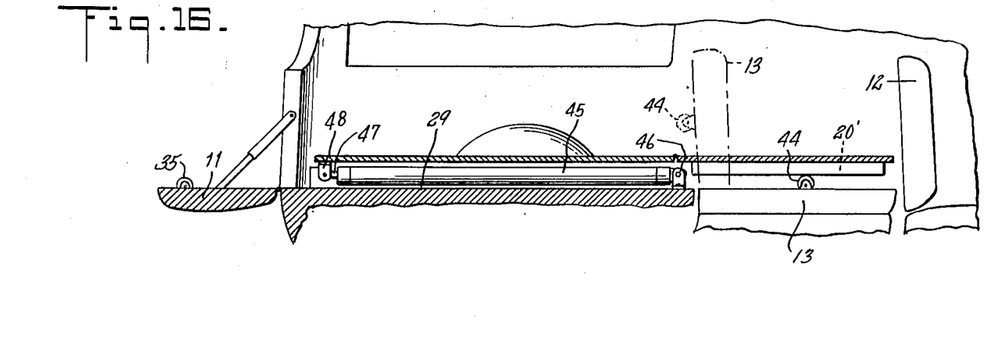
FIG. 16 is a vertical sectional view taken along the line 16—16 in FIG. 15.

While the motor system above described is desirable for certain installations, it will be understood that for other installations other means for actuating the platform 15 may be utilized. Even in the installation described, the movements of the platform 15 may be accomplished to equal advantage by means of a hydraulic cylinder, which as is shown in FIGS. 15 and 16 of the drawings, may be pivotally secured at its forward end to a bracket 46 mounted on the car floor 29 adjacently in back of seat 13. The outer end of the piston 47 of such cylinder may be connected by means of a bracket to the underside of the rear end of the platform 15. A pair of tubings 49 and 50 may both be in communication at one end thereof with the cylinder 45 on opposite sides of the piston 47' thereof. The other ends of the tubings 49 and 50 may be connected to a solenoid operated control valve 52 constructed to connect one of such passageways to a compressed air tank 51 and the other passageway to the atmosphere in one position of such valve, and in the other direction of such valve to connect such other passageway to the compressed air tank and said one passageway to the atmosphere. Thus, in the movements of the piston on rod 47, it is always subjected on one side to positive air pressure from the tank 51, while the other side is connected to the atmosphere. The valve 52 is connected to the tank 51 through a length of tubing 42 and is included in a circuit similar to that described hereinabove with regard to the electric motor 65 by means of the wires 54. It will be understood that the operation of this circuit is similar in all respects to the one associated with the motor 65 except that in this construction a hydraulic unit 45 is operated instead.

It is believed that the operation of the load platform 15 and its extension 16 will be readily understood from the foregoing. It might be stated by way of summary, however, that the platform may be utilized with the extension 16 folded down on such platform or with the extension unfolded to take advantage of space that may be availed of when the rear seat is folded. The movements of the platform are controlled primarily by the switch 55. The power required for such movements of the platform is relatively small even with heavy loads mounted thereon and may be furnished by a relatively small motor run on current from the vehicle battery or by a relatively simple hydraulic device actuated either from the engine or by a small supply of compressed air. The small amount of power required is due in large part to the smooth easy movements of the platform resulting from the coaction of the supporting rails and rollers and to some extent by the roller support provided along the centerline of the platform. As has been described, the movements of the platform are automatically controlled by limit switches which cooperate in their functioning with the main switch 55. The limit switches are of such construction and arrangement that they permit additional travel of the platform when needed or permit the platform to be removed entirely from the vehicle to provide for easy access to the tire 30 in the compartment 31 formed in the floor of the vehicle. It will be evident, however, that this can also be accomplished without removing the platform by folding the extension 16 upon the same and turning the back of seat 13 down. The platform can then be advanced sufficiently forward over the seat 13 to expose the tire compartment. In such position of the platform the forward ends of the rails 20 will have moved off the rollers 24 of the supports 27 and will be riding on the rollers 44 provided on the back of the seat 13.

Figure 13:
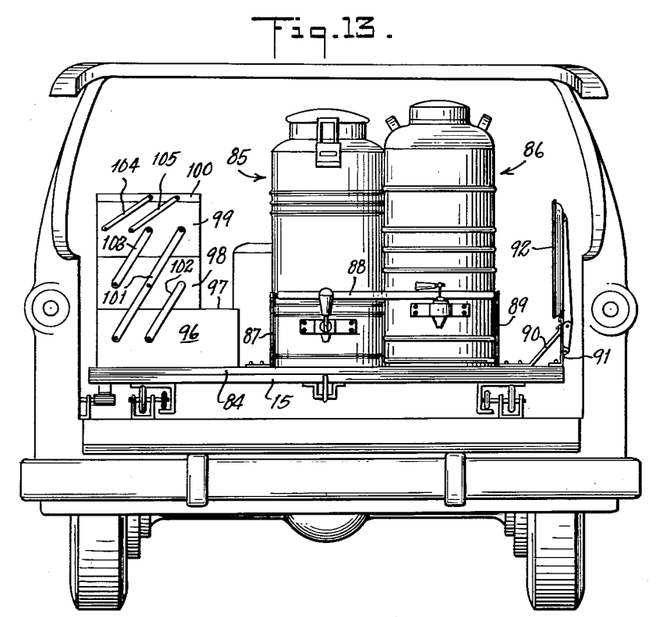
FIG. 13 is a rear elevational view of an opened station wagon provided with the load platform of this invention and illustrates how the load platform may be utilized to convert the vehicle into a mobile restaurant.
Figure 14:
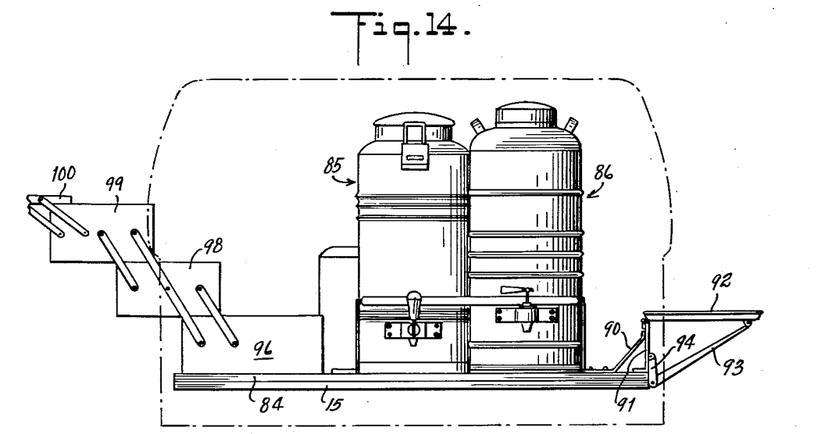
FIG. 14 is a similar view of the loading platform shown in FIG. 13, but moved rearwardly out of the vehicle and with the equipment ready for service.

The versatility of the apparatus of this invention is believed to be obvious. Thus for the usual purchasers of station wagons it provides a ready and easy method of loading and unloading such type of vehicle of the many and varied objects which they are capable of handling. It can also be used to advantage as an outdoor table for which purpose it may be equipped with a large umbrella 82 (note FIG. 1) as a protection against the elements. In such case the platform 15 is provided with an advantageously placed hole 80 through which is inserted the umbrella handle 81, the umbrella being thus supported by the platform and the ground. The apparatus is also readily adapted to be equipped with kitchen units when incorporated in a station wagon or truck to be used commercially as a food dispensary. As shown in FIGS. 13 and 14 of the drawings, such a unit may include a coffee urn 85 and a hot water tank 86 of usual construction seated in any suitable fashion on a transverse plank 84 removably mounted on the platform 15. The urn 85 and tank 86 are secured in position on the plank 84 by means comprising brackets 87 and 89 which are fastened to the plank and a rubber sheathed coiled spring 88 stretched tautly between such brackets. The bracket 89 has integrally formed therewith an inclined arm 90 which is secured to a vertical plate 91 mounted on one end of the plank 84. Hingedly connected to the top edge of plate 91 is the inner edge of a tray 92 which pivots outwardly over the end of plank 84 in a direction at right angles to the length of the vehicle from a normal vertical position as shown in FIG. 13 to a horizontal position as shown in FIG. 14. In its horizontal position the tray is supported by an arm 93 which is pivotally connected at one end to the outer edge portion of the tray and which is pivotally connected at its other or inner end to a link 94 pivotally mounted on the outer surface of plate 91. This arrangement of link 94 and arm 93 enables the load on tray 92 to be applied to the edges of plank 84 and platform 15 thus minimizing strain on the latter and permits the tray to be retracted to its vertical normal position. The construction is convenient and readily operable to move the tray to its two positions. The plank 84 is provided on its other end with a storage unit that is removably mounted on such plank in any convenient manner. The storage unit comprises a bottom container 96 that is provided on its inner end with a partial cover 97 on which may be stacked paper cups and the like. The remainder of container 96 is covered by a shorter container 98 having a width similar to the width of container 96. On top of container 98 and covering the same is a similarly dimensioned container 99 provided with a removable cover 100. The containers are connected together with two sets of levers arranged to permit the containers to be moved from their stacked and closed relation as shown in FIG. 13 to the offset positions shown in FIG. 14 wherein the containers are still supported by one another but are shifted outwardly from the plank 84 so that the contents of all are readily available to the operator. The two sets of levers are mounted on the front and rear sides of the containers and each of such sets includes a pair of levers 101 and 102 which are pivotally connected at horizontally aligned points to a side of container 96 and, in the normal stacked relation of the containers, incline inwardly and upwardly in parallel relation over the associated side of container 98 to which they are pivotally connected at horizontally aligned points. The inner lever 102 terminates at its pivot on container 98, but lever 101 continues on over the associated side of container 99 to which it is also pivotally connected. Associated in parallelism with lever 101 is an outer lever 103 which is pivotally connected at its ends to containers 98 and 99 at points horizontally aligned with the points of connection of lever 101 with such containers. The cover 100 is pivotally connected to container 99 by two parallel levers 104 and 105 of the same length and inclined in the same direction as levers 101, 102 and 103 but at a greater angle from the vertical. With this system of levers, all the operator need do in order to uncover all of the containers simultaneously is to lift the inner end of cover 100 and then push such cover and the containers 98, 99 outwardly with a single motion.

Figures 17, 18, 19:
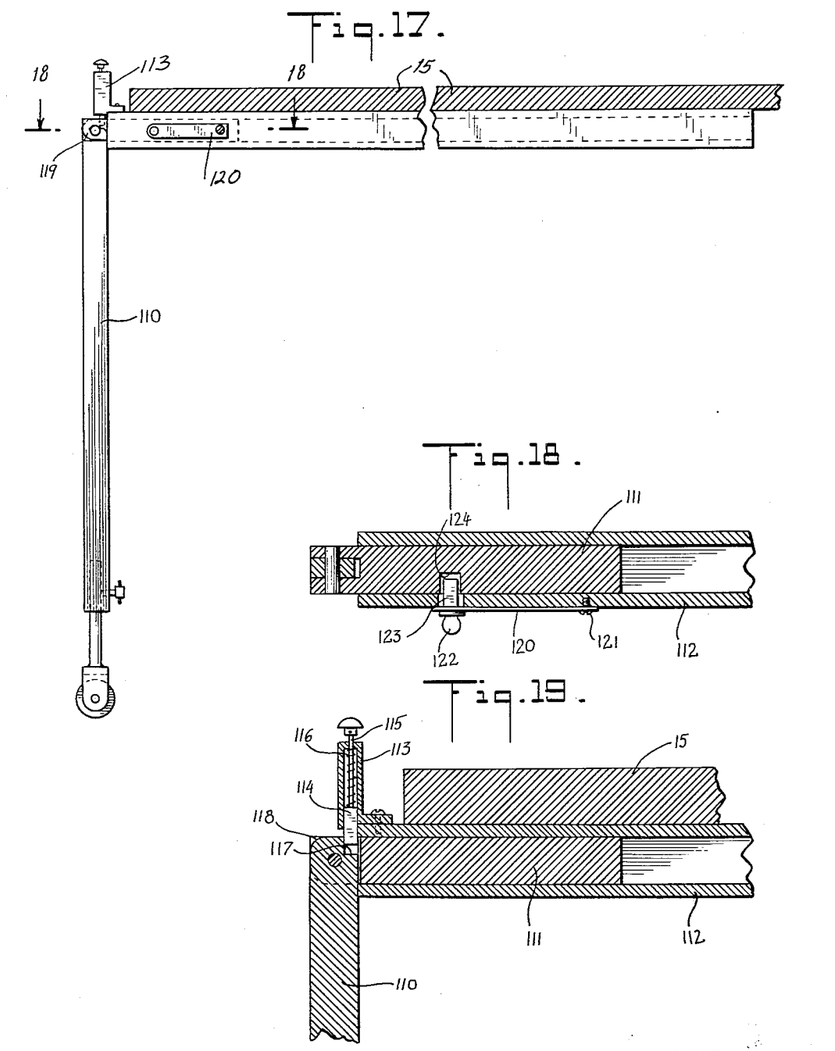
FIG. 17 is a side elevational view of a modified form of the supporting device in supporting position.
FIG. 18 is a sectional view taken along the line 18—18 of FIG. 17.
FIG. 19 is an enlarged vertical sectional view of the hinged portion of the supporting device with the associated parts thereof in the positions shown in FIG. 17.

In the modified form of tailboard supporting device shown in FIGS. 17 to 19 of the drawings, the support member 110 is hingedly connected to the portion 111 thereof located in the guide 112. The guide 112 is a rectangularly-shaped tube secured to the underside of the main platform 15 in the manner of the guide 72 in the previously described supporting device and adapted to receive both member 110 and portion 111 thereof when the former is brought into alignment with the latter. While member 110 and portion 111 are shown as solid in the drawings, it will be understood that they may also be made of suitable rectangularly-shaped tubing, such as aluminum tubing. The outermost position of portion 111 relative to the guide 112 is determined by a latch member 123 carried on the guide 112 and a recess 124 provided on the associated side of portion 111. The latch member 123 is provided on one end of a leaf spring 120 secured at its other end to the guide 112 by a screw 121. The latch member 123 is located in an opening in a wall of the guide 112 and bears against the sides of member 110 and portion 111 during the insertion and removal of member 110. When the recess 124 becomes aligned with the opening in guide 112 the latch member 123 will interlock with the same under the action of spring 120. A finger piece 122 is provided on the outer end of latch member 123 to enable it to be withdrawn from the recess 124.

Provided on the rear end of the guide 112 is a latch housing 113 for guiding the vertical movements of a latch member 114 mounted on the lower end of a slidable rod 115 and normally biased to advanced position by a spring 116. The edge 118 of the hinged end of member 110 between the ears 119 provided on the rear end of portion 111 is rounded to permit such end to slide past latch member 114 when member 110 is disposed in alignment with portion 111 thereof. However, when portion 111 is locked in position by latch member 123 and member 110 is pivoted downwardly to supporting position, as shown in FIGS. 17 and 19, a recess 117 provided in the hinged end of member 110 will come into alignment with the latch member 114 which under the pressure of spring 116 will enter into interlocking relation with such recess. The support member 110 by this arrangement will be locked in supporting position by both latch members 114 and 123. The rod 115 is provided with a finger knob at its upper end and by which latch member 114 may be withdrawn from its locking position. When the support member 110 is fully inserted into the guide 112, the latch member 114 will again advance to lock support member 110 within the guide.

While I have herein described and illustrated in the accompanying drawings, preferred embodiments of my invention, it will be apparent to those skilled in the art that various changes and modifications thereof may be made without departing from the spirit of the invention or the scope of the appended claims.

I claim:

1. In a vehicle, load bearing means comprising a platform, a pair of spaced rails extending in parallelism lengthwise of the vehicle and connected to said platform, said rails having vertical sections depending from said platform and upper and lower horizontal flanges integral with the longitudinal edges of said vertical sections, said upper horizontal flanges being secured to said platform and being provided on their inner surfaces with longitudinally extending grooves, a roller support fastened to the floor of the vehicle beneath the platform and extending longitudinally of the vehicle in parallelism with an adjacent to each rail, two longitudinally extending series of spaced rollers mounted on said support so that their rotational axes are located between the upper and lower flanges of said rail with which said support is associated, one series of said rollers riding in the longitudinal grooves of said upper flanges and the other series of said rollers riding on the inner surfaces of said lower flanges opposed to said grooved flange surfaces, and platform operating means for slidably moving said rail flanges relative to said associated series of said rollers, said operating means including mechanical means connected to said platform and operable to move the latter in two directions longitudinally relative to said vehicle, an electric switch, and electrically operated means controlled by said switch and operatively connected to said mechanical means to cause the latter to move said platform in one longitudinal direction or the other under the control of said switch.

2. A vehcle load bearing means such as defined in claim 1, including a platform extension hingedly connected to the front end of said platform to enable it to be folded in load bearing position upon said platform and to be unfolded to increase the load bearing area in advance of said platform, and a pair of rails attached to said platform extension so as to be in alignment with said platform rails in the unfolded condition of said extension, said platform extension rails in said unfolded condition of said extension extending in major portion beyond the front end of said roller support and having horizontal flanges comparable with the flanges on said platform rails and engageable with said series of spaced rollers of said roller support on rearward movement of said platform as continuations of the flanges on said platform rails.

3. A vehicle load bearing means such as defined in claim 2, in which separate roller units are mounted in such spaced relation in advance of the front ends of said roller supports and in aligned relation with the series of spaced rollers of said supports as to enable the rail flanges of said platform extension to ride thereon until supported by said support rollers.

4. A vehicle load bearing means such as defined in claim 1, including a pair of roller units mounted in spaced aligned relation to the rear of said supports beneath said platform to enable the outer surfaces of the lower rail flanges of said platform to ride thereon.

5. A vehicle load bearing means such as defined in claim 1, in which the mechanical means of said operating means includes a rack bar secured to the underside of said platform and extending longitudinally of the vehicle, and a gear engaging the teeth of said rack, and in which said electrically operable means includes an electrical reversible motor fastened to the floor of said vehicle and having said gear connected to the shaft thereof, and including the vehicle battery in the circuit of said switch and motor.

6. A vehicle load bearing means such as defined in claim 1, in which the mechanical means of said operating means includes a hydraulic cylinder, means connecting the piston rod of said cylinder to said platform, means connecting said cylinder to the floor of said vehicle, a source of fluid supply for operating said cylinder and a valve controlling the supply of such fluid to said hydraulic cylinder, and in which said electrically operable means includes an electric solenoid connected to and controlling said valve, and including the vehicle battery in the circuit of said switch and solenoid.

7. A vehicle load bearing means such as defined in claim 1, including a limit switch operatively connected to said operating means switch and mounted on the body of the vehicle adjacent to the rear end thereof, and means on the forward end of said platform engageable with said limit switch to operate the same when said platform has been fully moved to a rear position, said limit switch when so actuated being operable to render said operating means inoperative to move said platform.

8. The combination in a vehicle having a seat provided with a movable back, a platform normally positioned at the rear of such vehicle behind the seat, a platform extension hingedly connected to the front end of said platform to enable it to be positioned in folded condition upon said platform and extendible over the seat when the back of the latter is moved from back supporting position, a first pair of spaced rails extending in parallelism lengthwise of the vehicle and fastened to said platform, a second pair of spaced rails extending in alignment with said first pair of rails and fastened to said platform extension, said rails being disposed beneath said platform and platform extension in spaced relation on the undersurface thereof, a first longitudinally extending series of spaced rollers riding on upper surfaces of said first rails and a second longitudinally extending series of spaced rollers riding on undersurfaces of said first rails, said first and second series of rollers being mounted on the floor of said vehicle to the rear of said seat and engageable with comparable surfaces of said second rails when said platform extension overlies the same in extended condition, means provided on at least each of said first pair of rails coactable with an associated series of rollers to maintain said rails in operative relation with the associated series of rollers, and platform operating means including mechanical means connected to said platform for moving the latter in two directions longitudinally of said vehicle, control means for actuating said operating means, and electrically operated means controlled by said control means and operatively connected to said mechanical means to cause the latter to move said platform in one longitudinal direction or the other under the control of said switch.

9. The combination defined in claim 8, in which the back of said seat is foldable down to a position in which the rear surface of such back is substantially flush with the floor of the vehicle in rear of said seat to enable said platform extension to be unfolded to overlie such rear surface, and a pair of spaced roller units mounted on the rear of such back and aligned with said series of rollers when the seat back is folded down to enable said rails on said platform extension to engage the same.

10. In a vehicle, load bearing means comprising a movable platform extending lengthwise of the body of the vehicle in spaced parallel relation with the floor thereof, means slidably supporting said platform comprising a pair of rails extending longitudinally of the vehicle beneath the platform and disposed in spaced parallel relation, each of said rails being fixedly connected to and supported by said platform and being composed of a vertical section depending from said platform and a horizontal flange at the lower edge of said vertical section, a roller support extending in parallelism with and adjacent to each rail and mounted on the floor of the body of the vehicle beneath the platform, each of said roller supports including a first longitudinally extending series of spaced rollers having their rotational axes located between said platform and said horizontal flange of the rail associated therewith and said series of rollers engaging with an overlying track fixed with relation to said platform to support the latter on the tops of the peripheries thereof, and a second longitudinally extending series of spaced rollers disposed laterally of said first series of rollers and having their rotational axes located between said platform and said horizontal flange of the rail associated therewith, said second series of rollers riding on and having the bottoms of the peripheries thereof in engagement with the upper surface of said horizontal flange, and longitudinally extending guide means fixed with relation to said platform and engaging the peripheries of one of said series of rollers in each roller support and coactable with both of said series of rollers of said supports and said horizontal flanges to maintain said rails and roller supports in operative relation and thereby to lock said platform in position against lateral displacement, and means for slidably moving said platform lengthwise of the vehicle and relative to said roller supports.

11. In a vehicle such as defined in claim 10, in which each of said roller supports includes a series of shafts for both of said series of spaced rollers, a roller in one of said series being mounted in paired relation with a roller of the other series on one of said shafts, and fixed means supporting said shafts between said two series of rollers, and in which said longitudinally extending guide means associated with each roller support comprises a guide groove provided in the associated overlying track and receiving the peripheries of the rollers in said first series thereof.

12. In a vehicle such as defined in claim 10, including coactable means mounted on said platform and on the body of the vehicle and connected to said platform moving means, said coactable means controlling said platform moving means and operable to render the latter inoperative to move said platform when the latter in its movements moves to a given position relative to said vehicle body.

13. In a vehicle such as defined in claim 10, including control means mounted on the body of the vehicle and connected to said platform moving means and controlling the same, and means mounted on said platform and operable to control said control means, said operable means being constructed and arranged to operate said control means to render said platform moving means inoperative to move said platform when the latter in its range of movements in one direction moves into two different given positions relative to said vehicle body.

14. In a vehicle such as defined in claim 13, including means operable to reactivate said platform moving means after said platform has been stopped at one of said given positions by said operable means, to move said platform in the same direction to the second of said given positions.

15. In a vehicle having a seat provided with a movable back, load bearing means comprising a movable platform extending lengthwise of the body of the vehicle in spaced parallel relation with the floor thereof and including a body portion normally positioned at the rear of such vehicle body behind the seat, and an extension hingedly connected to the front end of said body portion to enable it to be positioned in folded condition upon said body portion and in extendible condition over the seat when the back of the latter is folded down, a first pair of rails extending longitudinally of the vehicle beneath said platform body portion and disposed in spaced parallel relation, each of said rails being fixedly connected to and supported by said body portion, a second pair of spaced rails fastened to and movable with said platform extension and extending in alignment with said first pair of rails when said extension is extended over the folded back of said seat, a roller support extending in parallelism with and adjacent to each of said first pair of rails and mounted on the floor of the body of the vehicle to the rear of said seat and beneath said platform body portion, said roller supports having a length approximating the length of said first pair of rails and including longitudinally extending series of spaced rollers coacting with said first pair of rails to slidably support said body portion, and coactable with said second pair of rails when said first pair of rails is withdrawn from normal position thereon to receive the same and thereby to slidably support said platform extension when the latter overlies said roller supports in extended condition, means cooperating with rollers on said roller supports to maintain said rails in operative relation with the rollers of said roller supports, and means for slidably moving said platform body portion lengthwise of the vehicle and relative to said roller supports, said moving means being operative to withdraw said body portion substantially beyond the rear ends of said roller supports and to move said platform extension relative to said roller supports through said body portion.

References Cited in the file of this patent

UNITED STATES PATENTS

| | | |
|---|---|---|
| 2,254,194 | Augustine | Aug. 26, 1941 |
| 2,643,395 | Stassinos | June 30, 1953 |
| 2,797,828 | Fritsche | July 2, 1957 |
| 2,863,670 | Larson | Dec. 9, 1958 |
| 2,892,556 | Lowe | June 30, 1959 |

FOREIGN PATENTS

| | | |
|---|---|---|
| 589,306 | Great Britain | June 17, 1947 |